United States Patent [19]

Humlong

[11] 4,331,270
[45] May 25, 1982

[54] BICYCLE BASKET

[75] Inventor: Robert F. Humlong, Maysville, Ky.

[73] Assignee: Wald Manufacturing Company, Maysville, Ky.

[21] Appl. No.: 197,245

[22] Filed: Oct. 15, 1980

[51] Int. Cl.³ .............................................. B62J 7/04
[52] U.S. Cl. ................................... 224/32 R; 224/31; 224/32 A; 224/39
[58] Field of Search .................. 224/31, 30 R, 32 R, 224/32 A, 39, 280; 220/19

[56] References Cited

U.S. PATENT DOCUMENTS

| 3,087,661 | 4/1963 | Glenny | 224/32 R |
| 3,301,448 | 1/1967 | Inoue | 224/32 R |
| 3,623,747 | 11/1971 | Humlong | 224/32 A X |
| 4,053,091 | 10/1977 | Martelet | 224/30 R X |
| 4,154,382 | 5/1979 | Blackburn | 224/39 |

Primary Examiner—Steven M. Pollard
Attorney, Agent, or Firm—Wood, Herron & Evans

[57] ABSTRACT

A bicycle basket with a novel connector bracket that permits the basket to be mounted on two different types of rear carrier racks. With a first type of carrier rack the novel bracket permits one end of the basket to be easily and quickly assembled with the rack simply by inserting a tongue attached to the rack in a slot provided in the bracket. With a second type of carrier rack, the basket's novel bracket is pivoted to an alternate position, the bracket being connected to the rack through use of a separate fastener, e.g., a bolt.

15 Claims, 8 Drawing Figures

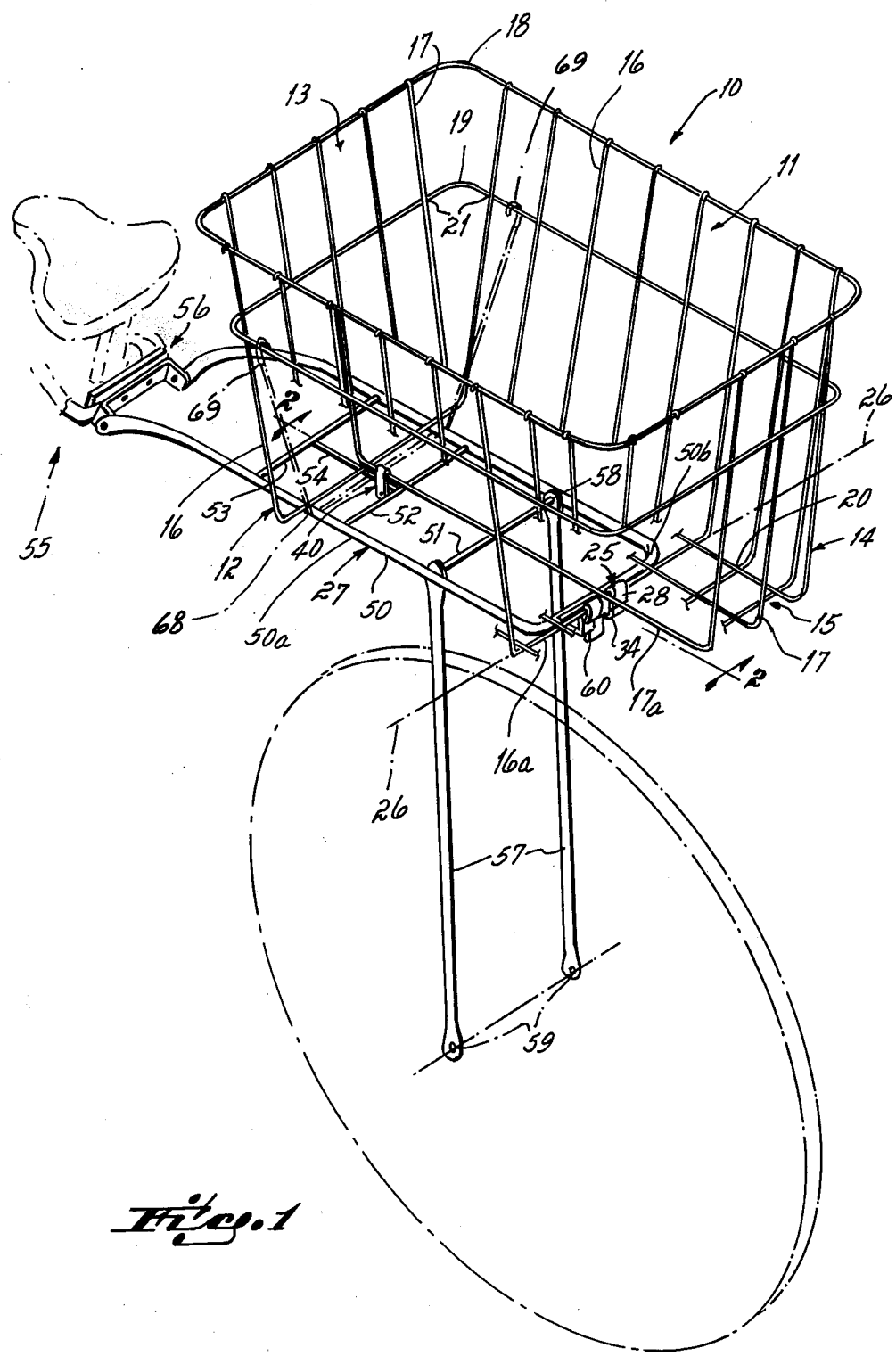

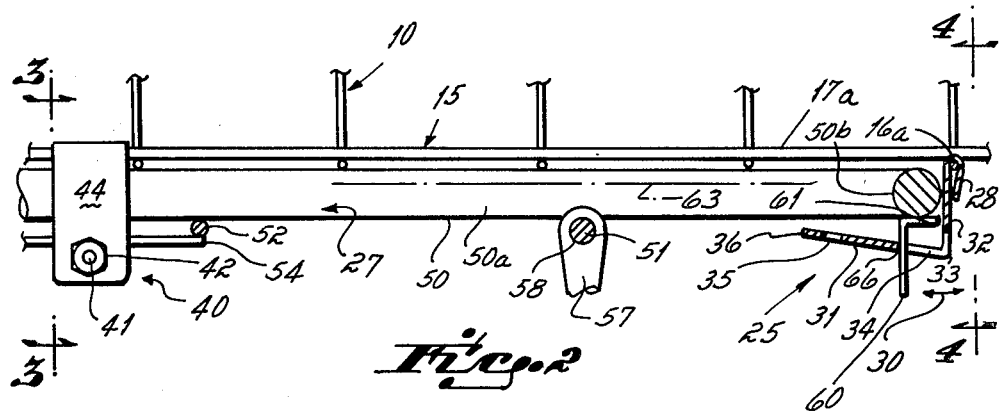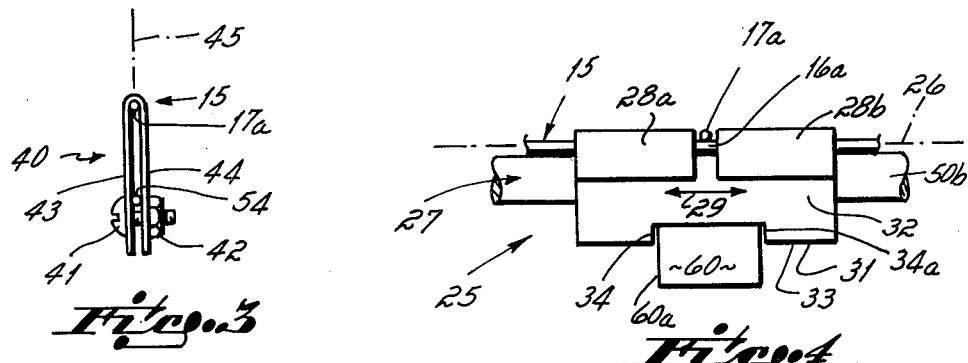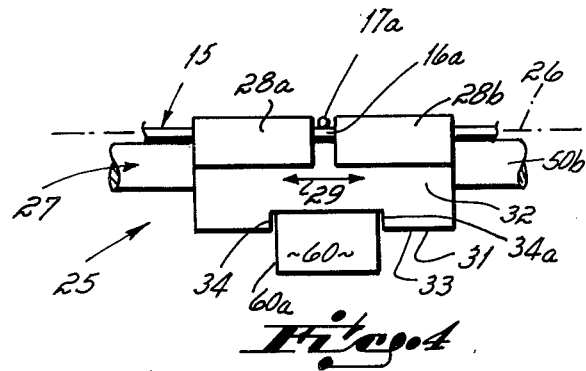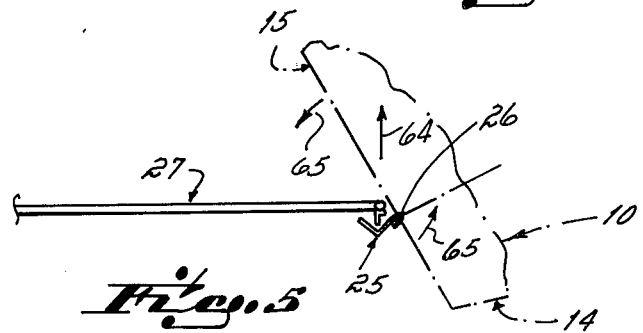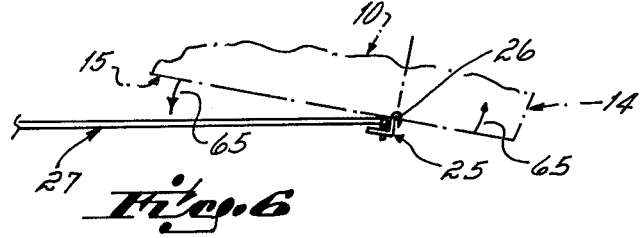

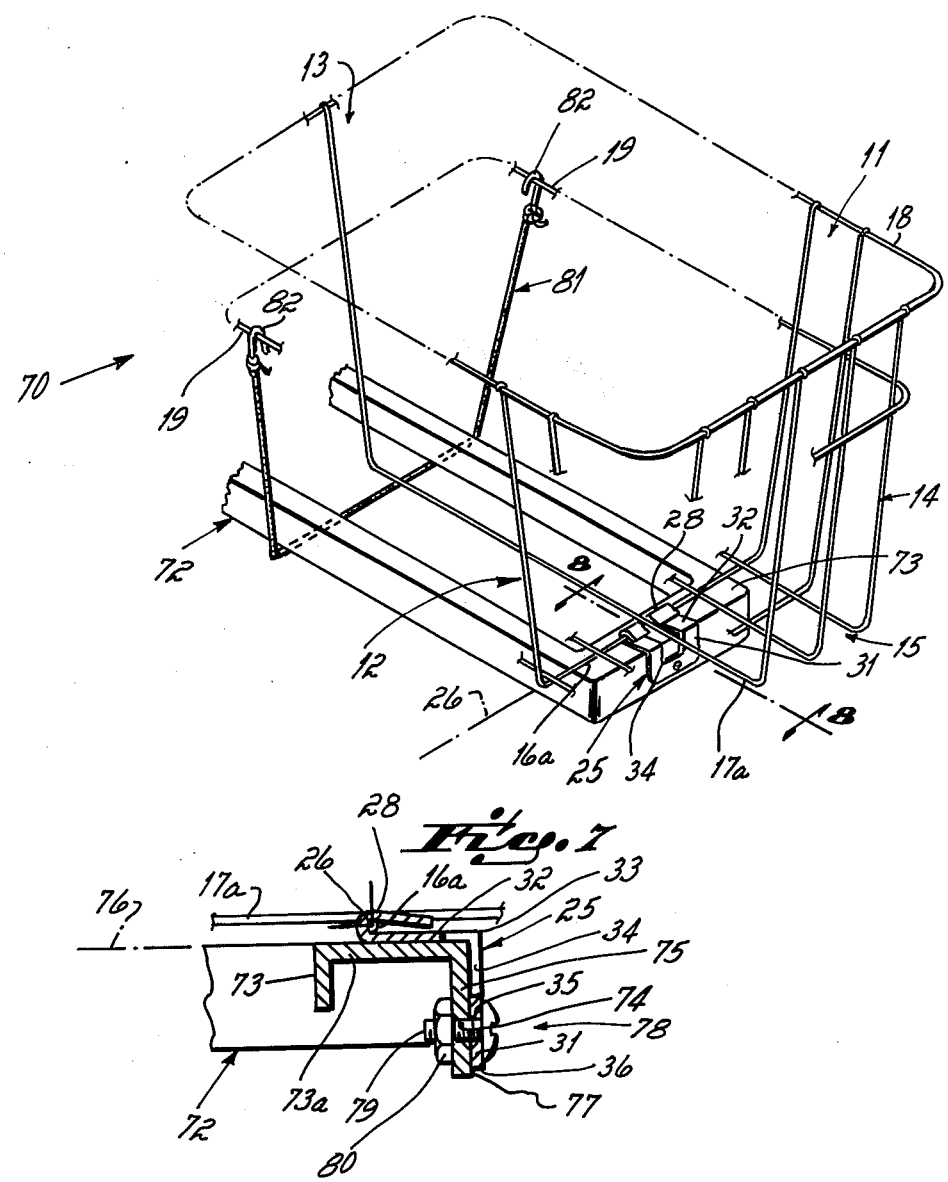

BICYCLE BASKET

This invention relates to bicycle baskets. More particularly, this invention relates to a novel bicycle basket that is connectable with a bicycle carrier rack.

It is well known in the art to mount a bicycle basket either in front of a bicycle's handlebars or in back of the bicycle's seat. And in the case of rear mounted baskets, it is well known to mount the basket on a rear carrier rack. A bicycle's rear carrier rack commonly includes a generally horizontal main frame attached at its front end to the bicycle's frame adjacent the bicycle's seat. The carrier rack's rear end is provided with legs that connect to the bicycle's frame adjacent the rear wheel's hub at the lower end, and to the rack's main frame at the upper end, to maintain the carrier rack in a generally horizontal posture. A bicycle basket is then mounted on the rear carrier rack, the longitudinal plane of the basket being oriented generally coplanar with the plane of the bicycle's main frame.

It is to the connectors by which the bicycle basket is mounted to the carrier rack that this invention is particularly directed. In the case of a rear basket connected to a rear carrier rack, the connectors previously known to the art have resulted in a couple of problems to the end user. In the first place, the known connectors require that the basket be installed on the carrier rack for which it was designed, i.e., a basket designed for connection with one rack structure cannot easily be used with another different rack structure. This, of course limits the number of potential end users for the basket. And in the second place, some known connectors often cause difficulty in installing the basket on the carrier rack. This is not desirable because the basket must be connected to the rack by the end user since the carrier rack and the basket are usually sold separately as supplemental bicycle equipment by a retailer.

Accordingly, it has been one objective of this invention to provide an improved bicycle basket with novel connector by which that basket can be easily and simply connected to a bicycle carrier rack without use of a separate fastener and, therefore, without use of hand tools.

It has been another objective of this invention to provide an improved bicycle basket with a novel connector where the connector is movable between first and second positions, the connector in the first position being connectable with one type of rear carrier rack without use of a separate fastener, and in the second position being connectable with another type of rack through use of a separate fastener.

In accord with the objectives, the bicycle basket of this invention includes a novel connector bracket that permits the basket to be mounted on two different types of rear carrier racks, the bracket being pivotable between first and second connect positions. With a first type of carrier rack, and with the novel bracket pivoted to the first position, the bracket permits one end of the basket to be easily and quickly assembled with the rack simply by inserting a tongue attached to the rack in a slot provided in the bracket. With a second type of carrier rack, and with the novel bracket pivoted to the second position, one end of the basket is connected to the rack through use of a fastener, e.g., a bolt that connects the bracket to the rack.

Other objectives and advantages of this invention will be more apparent from the following detailed description taken in conjunction with the drawings in which:

FIG. 1 is a perspective view illustrating a first embodiment of a bicycle basket in accord with the principles of this invention, the basket's connector bracket being shown in a first use position;

FIG. 2 is a cross-sectional view taken along line 2—2 of FIG. 1;

FIG. 3 is a cross-sectional view taken along line 3—3 of FIG. 2;

FIG. 4 is a cross-sectional view taken along line 4—4 of FIG. 2;

FIG. 5 is a partial schematic view illustrating assembly of the FIG. 1 basket with the FIG. 1 carrier rack at an initial step;

FIG. 6 is a view similar to FIG. 5 but showing assembly at a second step;

FIG. 7 is a view similar to FIG. 1, but illustrating a second embodiment of a bicycle basket in accord with the principles of this invention, the basket's connector bracket being shown in a second use position; and FIG. 8 is a cross sectional view taken along line 8—8 of FIG. 7.

A rear bicycle basket in accord with this invention, as illustrated in FIG. 1, includes a welded wire basket 10. The basket 10, which includes sidewalls 11, 12, front 13 and rear 14 endwalls, and floor 15 that define the basket cavity, is comprised of generally U-shaped transverse wires 16 and U-shaped longitudinal wires 17. The basket 10 also includes a top edge frame 18 and an intermediate reinforcement frame 19, each of which are in the form of a closed loop wire. The wall/floor wires 16, 17 are welded at cross-over points 20 one to the other, and are welded as at 21 to intermediate reinforcement frame 19. The top ends of the wall/floor wires 16, 17 are looped around the top edge frame 18.

A rear connector bracket 25 in accord with the principles of this invention is permanently attached to a cross floor wire 16a of the basket 10 at the rear of the basket, the connection being such that the bracket can swing or move on axis 26 established by that cross wire when the basket is not connected to carrier rack 27. The connector bracket 25, which is of an acute angle cross-sectional configuration as shown in FIG. 2, is connected with the cross wire through use of a split sleeve 28, the two sleeve halves 28a, 28b being folded over the cross floor wire 16a as also shown in FIG. 4. Note the two split sleeve halves 28a, 28b are separated one from another a distance not significantly greater than the diameter of a longitudinal floor wire 17a positioned therebetween. This interconnection of the connector bracket 25 with the cross floor wire 16a relative to the centered longitudinal floor wire 17a prevents the bracket from substantial transverse sliding motion (as shown by phantom arrow 29) on the cross floor wire 16a while permitting significant pivotal motion (as shown by phantom arrow 30) of the bracket on that cross floor wire about axis 26, when the basket is not assembled with the carrier rack 27. The rear connector bracket 25 includes a latch web 31 and a bearing web 32 joined at corner 33. A slot opening 34 is established through the latch web 31 adajcent corner 33 with the bearing web 32, and the latch web is also provided with a bore 35 therethrough adjacent its lateral free edge 36, the purpose and function of which will be explained in greater detail below.

The bicycle basket 10 also includes front hold down means in the form of a front hold down bracket 40 at the front of the basket that is of a generally U-shaped cross-sectional configuration, see FIGS. 2 and 3. The hold down bracket 40 is received in sliding relation on centered longitudinal floor wire 17a of the basket, the same floor wire 17a about which the connector basket 25 is symmetrically disposed. This front hold down bracket 40 is provided with a bolt 41 and nut 42 spaced from the joinder of the bracket's webs 43, 44 at a distance the purpose of which is described in greater detail below. Thus, both the connector bracket 25 and hold down bracket 40 are symmetrically disposed relative to the center longitudinal vertical plane 45 defined by the basket 10.

The rear basket 10 illustrated in FIG. 1 is particularly adapted for use with a rear carrier rack 27 of the type also shown in FIG. 1. This carrier rack 27 is comprised of a main frame 50 adapted to be horizontally disposed relative to ground when the carrier rack is mounted on a bicycle. The rack's frame 50 includes a leg rod 51 adjacent the rear end thereof, and cross reinforcement rods 52, 53, all positioned transverse to the sides 50a of the one piece U-shaped frame. A connector rod 54 spaced equally between and parallel to the frame's side members 50a innerconnects the cross reinforcement rods 52, 53, same being all welded one to the other and to the frame's side members. The carrier rack 27 is connectable to a bicycle's frame 55 at the front end thereof by means of any frame connector assembly 56 known to the prior art. The carrier rack is also connected to the bicycle's frame adjacent the rear wheel's hub (not shown) by rear legs 57 also as known to the art. Each rear leg 57 is pivotally connected as at 58 on the rack frame's leg rod 51 at one end, and is immobily connected by bolts (not shown) to the bicycle frame (not shown) as at 59 at the other end.

Importantly relative to the first embodiment of the bicycle basket 10 of this invention, this first type of rear carrier rack 27 also carries a depending tongue 60 mounted on rear member 50b centrally between the side members 50a of the rack's frame 50 and depending from that frame. This generally vertical tongue 60 includes a mounting web 61 welded to the underside of the U-shaped frame's rear member 50b for holding the flat tongue in immobile relation to the rod stock from which the frame 50 is formed. Note particularly, therefore, that the tongue 60 is oriented generally perpendicular to the support plane 63 of the rack's frame.

In assembly of the bicycle basket 10 with the carrier rack 27, initially the basket is tilted so that its floor 15 is positioned at an acute angle relative to the carrier rack's support plane 63 as shown in FIG. 5. In this initial assembly position, the basket is then raised in the direction as shown by phantom arrow 64 until the rack's tongue 60 is received through the rear connector bracket's slot opening 34, the basket thereafter being pivoted as shown by phantom arrows 65 in FIGS. 5 and 6 until the basket's floor 15 rests on top the rack's frame 50. In this intermediate assembly position, the front hold down bracket 40 (with the bolt 41 and nut 42 removed from assembly therewith) is interengaged with the basket's longitudinal floor wire 17a and the rack frame's longitudinal connector rod 54, and the bolt 41 and nut 42 reinstalled, all as shown in FIG. 3, to complete assembly of the basket 10 with the rack 27. Note particularly that the rear connector bracket 25 is thereby innerconnected with the carrier rack 27 in a first use position where the bracket's latch web 31 is generally horizontal without the use of a separate fastener of any kind. In this assembled attitude, which is quite easy to achieve, rearward movement of the basket 10 on the carrier rack 27 is prevented due to abutment of the connector bracket's latch edge 66 with the rack's tongue 60, and forward movement of the basket on the carrier rack is prevented by that same abutment relationship along with the contact of bearing web 32 with frame's rear member 50. Further, substantial side to side sliding motion (in the direction shown by arrows 29) of the basket 10 on the rack is prevented by contact of slot sides 34a of the bracket's slot opening 34 with side edges 60a of the rack's tongue. This structure relation, therefore, presents a stable connected relationship between the basket 10 and the rack 27. Of course, disassembly of the basket 10 with the carrier rack 27 is achieved just as easily as original mounting of the basket on the frame, but by the reverse sequence of steps.

An alternative front hold down means to the front hold down bracket 40 is elastic strap 68 with hooks 69 at each end as shown in phantom lines in FIG. 1. When the elastic strap 68 is used in place of hold down bracket 40, and when the elastic strap is stretched taut beneath the carrier rack 27 with hooks 69 attached to the basket's intermediate frame 19, the basket 10 is held firmly in place on the rack because of the structural connection established by the basket's bracket 25 and the rack's tongue as set out in the above paragraph. However, and importantly, the bicycle's user may easily remove the basket 10 from the carrier rack 27 without use of any hand tools whatsoever, and then easily and quickly reinstall the basket on the carrier rack as described above without use of any hand tools, when the elastic strap 68 is used. This is desirable, e.g., if the bicycle's userwishes to remove the basket and carry it into a store for use as a shopping basket.

A second embodiment of a bicycle basket 70 in accord with the principles of this invention is illustrated in FIGS. 7 and 8. The bicycle basket 70 is identical to the basket 10 illustrated in FIGS. 1-6 with the exception that no hold down bracket 40 is used. In other words, the general basket 10 structure of the two embodiments is the same, and the rear connector bracket 25 for both embodiments is the same, identical reference numbers being used to identify identical parts.

The second type of carrier rack 72 with which the basket 70 is used, however, differs somewhat from the carrier rack 27 used with the basket 10. The first carrier rack 27 used with the first basket 10 is structured with a tongue 60 depending from the rack frame's rear member 50b that interfits with the basket's rear connector bracket 25. The second carrier rack 72 adapted for use with the second basket 70, however, is comprised of inverted channel shaped frame members 73 to provide the U-shaped rack, and does not incorporate a tongue adapted to interfit with the bracket's slot. With rack 72, a bore 74 is provided in rear wall 75 of the rack frame's rear cross member 73a.

In use of the bicycle basket 70 with the second type of carrier rack 72, note the basket's rear connector bracket 25 is pivoted to a second use position where its latch web 31 is generally perpendicular relative to plane 76 of the carrier rack. The basket 70 is located on the rack 72 so that the latch web 31 is positioned in abutted relation with the rear surface 77 of the frame's rear member 73a as shown in FIGS. 7 and 8. In this mounting position, a separate fastener 78, e.g., bolt 79 and nut 80, cooperate with bore 35 in the connector bracket's latch web 31 and bore 74 in rear wall of the carrier rack's rear member 73a to interconnect the basket's connector bracket 25 and, therefore, the basket 70 with the carrier at the rear end of the carrier rack in the final assembly position. Also cooperating with the basket 70 and rack 72 in the final assembly position is front hold down means in the form of an elastic strap 81 positioned adjacent the front wall 13 of the basket. The elastic strap 81 includes hooks 82 connected at each end, the hooks being adapted to interconnect with the basket's intermediate frame 19, and the elastic strap being stretched around the carrier rack's frame 73, all in the manner shown in FIG. 7, to retain the basket in final assembly with the carrier rack. In this assembled attitude of the basket 70 and carrier 72, the fastener 78 connection of the basket's swingable connector bracket 25 with the carrier rack's rear wall 75 prevents forward and rearward motion of the basket on the rack, as well as side to side sliding motion of the basket's rear end on the rack. With this second type of rack 72, easy and quick removal and re-mounting of the basket 70 with the rack 72 is not available since a hand tool is required to remove or tighten fastener 78.

Therefore, and in accord with the principles of this invention, a connector bracket 25 is provided for a bicycle basket 10, 70 in which the connector bracket is swingably mounted to the basket on pivot axis 26. The connector bracket 25 includes a latch web 31 and latch slot opening 34 particularly structured to cooperate with a depending tongue 60 on one type of carrier rack 27 when in a first use position as shown in FIGS. 1-6, and is also provided with a through bore 35 for receiving fastener 78 to connect the bracket with another type of carrier rack 72 when in a second use position pivoted substantially 90° relative to the first use position as shown in FIGS. 7 and 8.

Having described in detail the preferred embodiment of my invention, what I desire to claim and protect by Letters Patent is:

1. A bicycle basket connectable to a bicycle carrier rack, said basket comprising
   walls and a floor to define the basket cavity of said basket,
   a connector bracket swingably mounted to said basket's floor, said connector bracket being pivotable to a first use position at which said bracket is adapted to interconnect said basket with a first carrier rack structure, and said bracket being pivotable to a second and different use position at which said bracket is adapted to interconnect said basket with a second and different carrier rack structure, and
   said first carrier rack comprising a tongue, and said connector bracket comprising a latch web that defines a latch slot opening therein, said latch slot structure being adapted to receive said tongue on said first carrier rack through the latch slot opening, thereby permitting connection of said bracket with said first carrier rack structure without use of a separate fastener.

2. A bicycle basket as set forth in claim 1, said second carrier rack comprising structure that defines a bore, and said connector bracket comprising structure defining a bore through one web of said bracket, said bores being adapted to cooperate with a fastener for connection of said bracket with said second carrier rack.

3. A bicycle basket as set forth in claim 2, said connector bracket comprising
   a split sleeve by which said connector bracket is swingably connected to one of a transverse basket wire and a longitudinal basket wire that at least partially defines the floor of said basket, said split sleeve cooperating with the other of said transverse and longitudinal basket wire to prevent substantial sliding motion of said bracket on said one basket wire.

4. A bicycle basket as set forth in claim 3, said connector bracket being swingably connected to a transverse basket wire, and said longitudinal basket wire being positioned in the longitudinal center plane of said basket.

5. An assembly of a bicycle basket and a bicycle carrier rack, said assembly comprising
   walls and a floor to define the basket cavity of said basket,
   a connector bracket swingably mounted to said basket's floor, said connector bracket being pivotable to a first use position at which said bracket is adapted to interconnect said basket with a first carrier rack structure, and said bracket being pivotable to a second and different use position at which said bracket is adapted to interconnect said basket with a second and different carrier rack structure and,
   said assembly comprising a tongue mounted on said first carrier rack, and a latch web constituting a part of said connector bracket, said latch web defining a latch slot opening therein, said latch slot being adapted to receive said tongue through the latch slot opening for connection of said bracket with said first carrier rack structure without use of a separate fastener.

6. A bicycle basket as set forth in claim 5, said assembly comprising
   structure defining a bore mounted on said second carrier rack, and
   structure defining a bore through one web of said bracket said bores being adapted to cooperate with a fastener for connection of said bracket with said second carrier rack.

7. An assembly as set forth in claim 6, said assembly comprising
   a split sleeve by which said connector basket is swingably connected to one of a transverse basket wire and a longitudinal basket wire that at least partially defines the floor of said basket, said split sleeve cooperating with the other of said transverse and longitudinal basket wire to prevent substantial sliding motion of said bracket on said one basket wire.

8. A bicycle basket connectable to a bicycle carrier rack, said basket comprising
   walls and a floor to define the basket cavity of said basket,
   a tongue mounted on said carrier rack, and
   a connector bracket mounted to said basket's floor, said connector bracket being adapted to interconnect said basket with said carrier rack, said connector bracket comprising a latch web that defines a latch slot opening therein, said latch slot structure being adapted to receive said tongue on said carrier rack through the latch slot opening, thereby permitting connection of said bracket with said carrier rack structure without use of a separate fastener.

9. A bicycle basket as set forth in claim 8, said connector bracket being pivotable to a first use position at which said bracket is connectable to a first carrier rack structure, and said bracket also being pivotable to a second and different use position at which said bracket is adapted to interconnect said basket with a second and different carrier rack structure.

10. A bicycle basket as set forth in claim 9, said second carrier rack comprising structure that defines a bore, and said connector bracket comprising structure defining a bore through one web of said bracket, said bores being adapted to cooperate with a fastener for connection of said bracket with said second carrier rack.

11. A bicycle basket as set forth in claim 10, said connector bracket comprising
   a split sleeve by which said connector bracket is swingably connected to one of a transverse basket wire and a longitudinal basket wire that at least partially defines the floor of said basket, said split sleeve cooperating with the other of said transverse and longitudinal basket wire to prevent substantial sliding motion of said bracket on said one basket wire.

12. An assembly of a bicycle basket and a bicycle carrier rack, said assembly comprising
   walls and a floor to define the basket cavity of said basket, and
   a tongue mounted on said carrier rack,
   a connector bracket mounted to said basket's floor, said connector bracket being adapted to interconnect said basket with said carrier rack, said connector bracket comprising a latch web that defines a latch slot opening therein, said latch slot opening being adapted to receive said tongue through the latch slot opening for connection of said bracket with said carrier rack structure without use of a separate fastener.

13. An assembly as set forth in claim 12, said connector bracket being pivotable to a first use position at which said bracket is connectable to a first carrier rack structure, and said bracket being pivotable to a second and different use position at which said bracket is adapted to interconnect said basket with a second and different carrier rack structure.

14. A bicycle basket set forth in claim 13, said assembly comprising
   structure that defines a bore mounted to said second carrier rack, and
   structure defining a bore through one web of said bracket, said bores being adapted to cooperate with a fastener for connection of said bracket with said second carrier rack.

15. An assembly as set forth in claim 14, said assembly comprising
   a split sleeve by which said connector bracket is swingably connected to one of a transverse basket wire and a longitudinal basket wire that at least partially defines the floor of said basket, said split sleeve cooperating with the other of said transverse and longitudinal basket wire to prevent substantial sliding motion of said bracket on said one basket wire.

* * * * *

UNITED STATES PATENT AND TRADEMARK OFFICE
CERTIFICATE OF CORRECTION

PATENT NO. : 4,331,270
DATED : May 25, 1982
INVENTOR(S) : R. F. Humlong

It is certified that error appears in the above—identified patent and that said Letters Patent is hereby corrected as shown below:

At column 3, line 4, "basket" should be --bracket--.

At column 4, line 33, "userwishes" should be --user wishes--

At column 6, line 43, "basket" should be --bracket--

Signed and Sealed this

Twelfth Day of October 1982

|SEAL|

Attest:

GERALD J. MOSSINGHOFF

Attesting Officer

Commissioner of Patents and Trademarks